US006946511B2

(12) United States Patent
Iwamoto et al.

(10) Patent No.: US 6,946,511 B2
(45) Date of Patent: Sep. 20, 2005

(54) PLASMA RESISTANT ELASTOMER PARTS

(75) Inventors: Kaori Iwamoto, Tochigi (JP); Bunichi Rai, Tokyo (JP); Shinichi Sogo, Kanagawa (JP)

(73) Assignee: DuPont Dow Elastomers, LLC, Wilmington, DE (US)

( * ) Notice: Subject to any disclaimer, the term of this patent is extended or adjusted under 35 U.S.C. 154(b) by 0 days.

(21) Appl. No.: 10/689,329

(22) Filed: Oct. 20, 2003

(65) Prior Publication Data

US 2004/0152827 A1 Aug. 5, 2004

Related U.S. Application Data

(60) Provisional application No. 60/421,947, filed on Oct. 29, 2002.

(51) Int. Cl.[7] .................................................. C08K 3/10

(52) U.S. Cl. ....................... 524/431; 524/543; 524/544; 524/435

(58) Field of Search ................................ 524/543, 544, 524/431, 435

(56) References Cited

U.S. PATENT DOCUMENTS 5,062,904 A * 11/1991 Yoden ........................ 148/105
5,431,769 A * 7/1995 Kisakibaru et al. .... 156/345.46
5,990,218 A * 11/1999 Hill et al. ................... 524/431
6,190,496 B1 * 2/2001 DeOrnellas et al. ... 156/345.44
6,228,933 B1 5/2001 Hiles
6,237,424 B1 * 5/2001 Salmasi et al. .......... 73/861.17
2002/0084439 A1 * 7/2002 Hart et al. ............... 252/62.54

FOREIGN PATENT DOCUMENTS

EP 1331652 A2 * 7/2003
WO WO-98/50460 * 11/1998
WO WO 98/50460 11/1998
WO WO 00/74541 A1 12/2000
WO WO-00/74541 A1 * 12/2000

* cited by examiner

*Primary Examiner*—David W. Wu
*Assistant Examiner*—Henry S. Hu

(57) ABSTRACT

Elastomeric parts having a magnetic flux density of at least 10 gauss on their surface deflect a portion of reactive plasmas from contact with the surface of the parts. Thus, such parts may be exposed to reactive plasmas for longer periods, with less degradation, than may similar elastomer parts that do not have such a magnetic flux density on their surface.

8 Claims, 3 Drawing Sheets

PLASMA RESISTANT ELASTOMER PARTS

CROSS-REFERENCE TO RELATED APPLICATIONS

This application claims the benefit of U.S. Provisional Application No. 60/421,947 filed Oct. 29, 2002.

FIELD OF THE INVENTION

This invention relates to elastomer parts which are resistant to attack by certain plasmas due to a magnetic flux density of at least 10 gauss on the surface of the parts.

BACKGROUND OF THE INVENTION

Elastomer sealing components used in equipment for manufacture of electronic components, for example semiconductor devices, must meet unusually stringent property requirements. Specifically, the seals are often exposed to reactive plasmas, corrosive cleaning gases and high temperatures that may cause degradation of the elastomer, resulting in loss of physical properties and generation of residue material which may contaminate the semi-conductor devices being manufactured.

Typically, elastomer parts which will be exposed to plasmas in semiconductor manufacturing equipment are fabricated from perfluoroelastomers, fluoroelastomers or silicone elastomers because of their natural resistance (listed in decreasing order) to reactive plasmas. However, even perfluoroelastomers degrade over time when exposed to reactive plasmas.

Others have improved the plasma resistance of perfluoroelastomers by judicious selection of compounding additives. For example, Legare (U.S. Pat. No. 5,696,189) substituted a metallic filler for carbon black and included titanium dioxide and an acid acceptor in his elastomer seal compositions. Katsuhiko et al. (JP 3303915 B2) employed fine particle size aluminum oxide in elastomer seal compositions. Both patents disclose seals having improved resistance to attack by plasmas and reduced residue formation. However, there remains a need in the industry for elastomer parts having still better plasma resistance. Thus, an object of the present invention is elastomer parts that are more resistant to attack by plasma than are prior art parts, as evidenced by less weight loss and by reduced production of residue due to exposure to plasma.

SUMMARY OF THE INVENTION

An aspect of the present invention is an elastomer part having a magnetic flux density of at least 10 gauss at its surface. The magnetic flux at the surface of the part may arise in two ways, 1) the part may contain an internal source for the magnetic flux such as one or more small permanent magnets, or an electromagnet, or 2) an external magnetic source such as one or more permanent magnets or electromagnets may be placed in close proximity to the surface of the part.

DETAILED DESCRIPTION OF THE INVENTION

The elastomer parts of this invention have a magnetic flux density of at least 10 gauss, preferably at least 200 gauss, at their surface for repelling a portion of the charged particles present in reactive plasmas. Thus the surfaces of the elastomeric parts of this invention which are exposed to plasmas are not subject to the same degree of attack and polymer degradation as are the exposed surfaces of similar parts that do not have a magnetic flux density of at least 10 gauss at their surface. The elastomer parts of this invention produce less contaminating residue and experience reduced weight loss when exposed to reactive plasmas than do similar elastomer parts that are not protected by a magnetic flux at their surface. In fact, weight loss of elastomer parts of this invention is typically reduced by 20% (preferably 50%) relative to the weight loss experienced by similar parts, not protected by a magnetic flux.

Elastomers suitable for use in the compositions of the parts of this invention include, but are not limited to perfluoroelastomers, fluoroelastomers, silicones, nitrile rubbers and ethylene elastomers such as chlorinated polyethylenes, EPDM, ethylene/olefin copolymers, etc. Perfluoroelastomers, fluoroelastomers and silicone rubbers are preferred. Perfluoroelastomers are especially preferred. Typical perfluoroelastomers, fluoroelastomers and suitable curative systems have been well described in the art. See for example, U.S. Pat. Nos. 6,281,296 B1; 6,114,452; 5,789,489; 4,214,060; and 3,876,654.

Additives, such as fillers, stabilizers, plasticizers, lubricants, and processing aids typically utilized in elastomer compounding can be incorporated into the elastomer parts of the present invention, provided that they have adequate stability for the intended service conditions.

Fillers such as carbon black, fluoropolymers, polyimides, and inorganic fillers (e.g. silicon dioxide, aluminum oxide, aluminum silicate, and barium sulfate) are used in elastomer compositions employed in this invention as a means to balance modulus, tensile strength, elongation, hardness, abrasion resistance, conductivity, and processability of the compositions. Fluoropolymer fillers (fibrillated or non-fibrillated) can be any finely divided, easily dispersed plastic fluoropolymer that is preferably solid at the highest temperature utilized in fabrication and curing of the elastomer composition. By solid, it is meant that the fluoroplastic, if partially crystalline, will have a crystalline melting temperature above the processing temperature(s) of the elastomer(s). Such finely divided, easily dispersed fluoroplastics are commonly called micropowders or fluoroadditives. When used in the compositions of this invention, 1–70 parts by weight filler per 100 parts by weight rubber (i.e. elastomer) (phr) is generally sufficient.

A whitener, such as titanium dioxide may also be present in the elastomer compositions employed in this invention.

Figure 1:
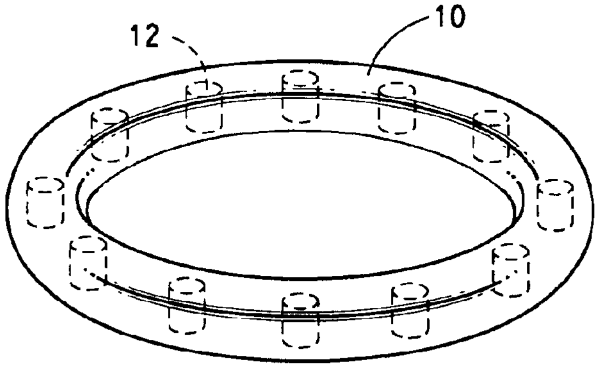
FIG. 1 shows an elevated side view of an O-ring seal of this invention containing a plurality of internal permanent magnets with poles aligned in the same direction.

Referring to FIG. 1, an elastomer part 10 of this invention may contain an internal magnetic material 12 in order to generate the required magnetic flux density at the surface of the part. The internal magnetic material may be one or more permanent magnets, magnetic wire, magnetic particles or an electromagnet. Suitable materials for permanent magnets include, but are not limited to ferrite magnets, ferrite-rubber magnets, aluminum-nickel-cobalt magnets and rare earth magnets such as samarium-cobalt, or neodymium magnets. The choice of material is based on the desired level of magnetic flux density at the surface of the seal and the conditions that the seal will be subjected to during manufacture and in use. For example, some materials may lose their magnetic properties if exposed to high temperatures, so care must be taken in selecting a magnetic material which will survive both seal manufacturing temperatures and end use environment temperatures.

Magnetic material is generally metallic and, if present at the surface of the elastomer parts of this invention, properties of the parts may be adversely effected. For example, sealing ability, thermal degradation resistance, and surface smoothness may all be harmed by having internal magnetic material at the surface, or too near the surface of the elastomer seal. Additionally, it is best practice not to allow plasma to directly contact the magnetic material. Thus, the manufacturing process for elastomer parts of this invention which contain an internal source of magnetic flux is designed so that the magnetic material is not exposed on the surface of the parts. An example of such a process is: 1) cover the bottom of a mold cavity with a first layer of uncured elastomer; 2) place a second elastomer layer over the first layer, the second layer having at least one appropriately sized and shaped hole for receiving a magnet; 3) inserting a magnet into each hole in the second elastomer layer, aligning the poles of each magnet in the same direction; 4) covering the second elastomer layer with a third elastomer layer; and 5) curing the resulting part under pressure.

Figure 2A:
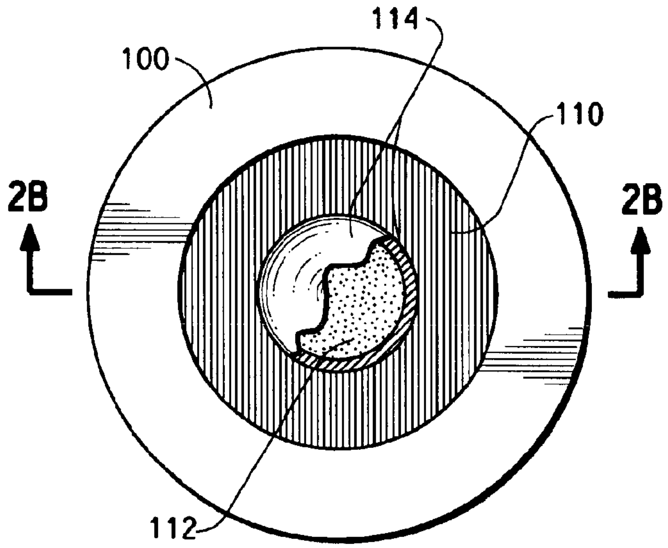
FIGS. 2A and 2B, respectively, show a plan view and a cross-section view taken along line 2B—2B of an elastomer part (i.e. an O-ring seal) of this invention having an external magnet mounted in close proximity to the surface of the O-ring.
Figure 2B:
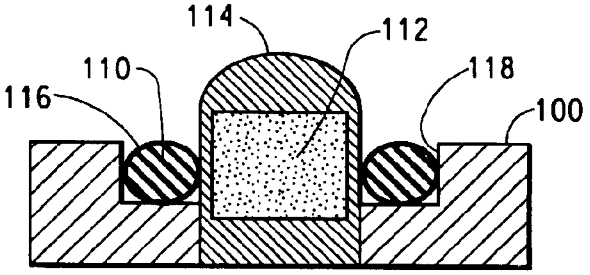

Alternatively (FIGS. 2A and 2B), the source 112 of the magnetic flux density at the surface of the elastomer part 110 of this invention may be external to the part. In such instances, the magnetic source 112 is placed in close proximity to (but not in contact with) the surface 116 of elastomer part 110 which will be exposed to plasma during use. Typically, the external magnetic source 112, such as one or more permanent magnets or an electromagnet, is placed along the periphery of the groove 118 in which elastomer part 110 is seated, or along the periphery of the elastomer part where it is bonded to a substrate. External magnetic source 112 should not be directly exposed to plasma during use. In FIGS. 2A and 2B, a conductive metal (e.g. aluminum) sheath 114 is employed to shield magnetic source 112 from exposure to plasma.

Alternatively, or in addition to the latter, the external magnetic source may be placed in the substrate to which the seal is pressed against while in use (not shown). Using a slit valve door on a semiconductor manufacturing vacuum chamber as an example, the external magnetic flux source may be placed 1) on the door along the periphery of the seal, 2) around the slit on the chamber in close proximity to where the seal will be in contact when the door is closed, or 3) a combination of both locations may be employed. In each case, the magnetic source is shielded by a metal material so that it is not directly exposed to plasma during use.

Whether the parts of this invention have an internal or external magnetic source, proper alignment of the magnetic field is important in order to maximize the protection from plasma attack afforded to the parts. For the elastomer part to have optimum plasma resistance, the magnetic poles should be aligned such that neither pole is near the surface of the part which will be exposed to plasma.

The elastomer parts of this invention are particularly suited for use in dry process semiconductor manufacturing processes where they will be subjected to reactive plasma environments. The parts may be used effectively in various applications such as plunger seals, door seals, lip and face seals, gas delivery plate seals, wafer support seals, barrel seals, etc. in such manufacturing processes and equipment.

Figure 3A:
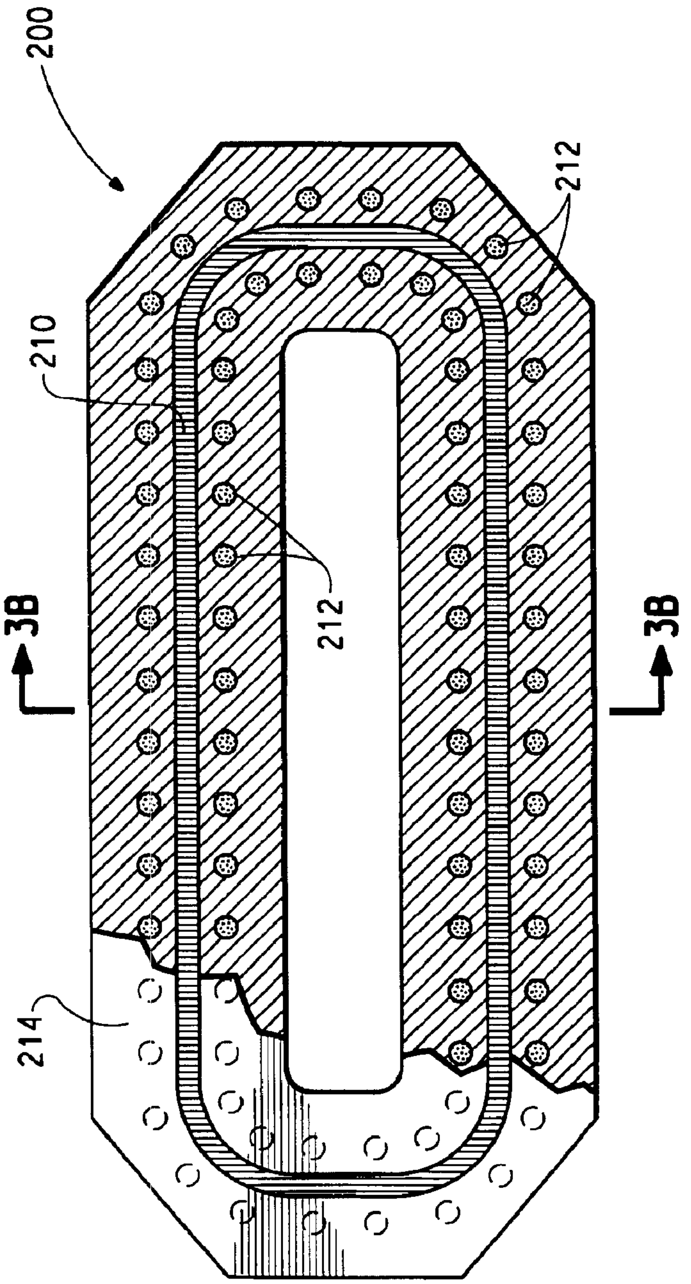
FIGS. 3A and 3B, respectively, show a plan view and a cross-section view taken along line 3B—3B of an elastomer part of this invention mounted in a slit valve door, said part having a plurality of external magnets mounted in close proximity to the surface of the part.
Figure 3B:
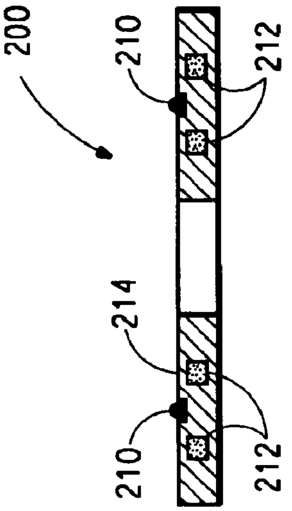

One preferred end use application for the elastomer parts of this invention is as slit valve door seals (FIGS. 3A and 3B) wherein the elastomer part 210 is typically either cured or bonded onto sealing surface 214 of the metal door 200, or seated in a groove on the sealing surface of the door. Bonded door seals are shown in U.S. Pat. No. 6,089,543. The door seal may be part of a one- or two-piece door assembly. The slit valve door 200 comprises a seal plate 214 and an elastomer part (i.e. a seal) 210 bonded thereto, said seal 210 having a magnetic flux density of at least 10 gauss (preferably at least 200 gauss) at its surface, i.e. the surface which will be exposed to plasma during use. The source of the magnetic flux may be either internal or external as described above. An external source, i.e. permanent magnets 212 mounted within seal plate 214, in close proximity to seal 210, running along each side of the seal, is depicted in the embodiment shown in FIGS. 3A and 3B. Although FIGS. 3A and 3B show an embodiment of the invention wherein magnets are located along both sides of seal 210, it is to be understood that an embodiment wherein the magnetic source is located along only one side of seal 210 is also contemplated.

Figure 4A:
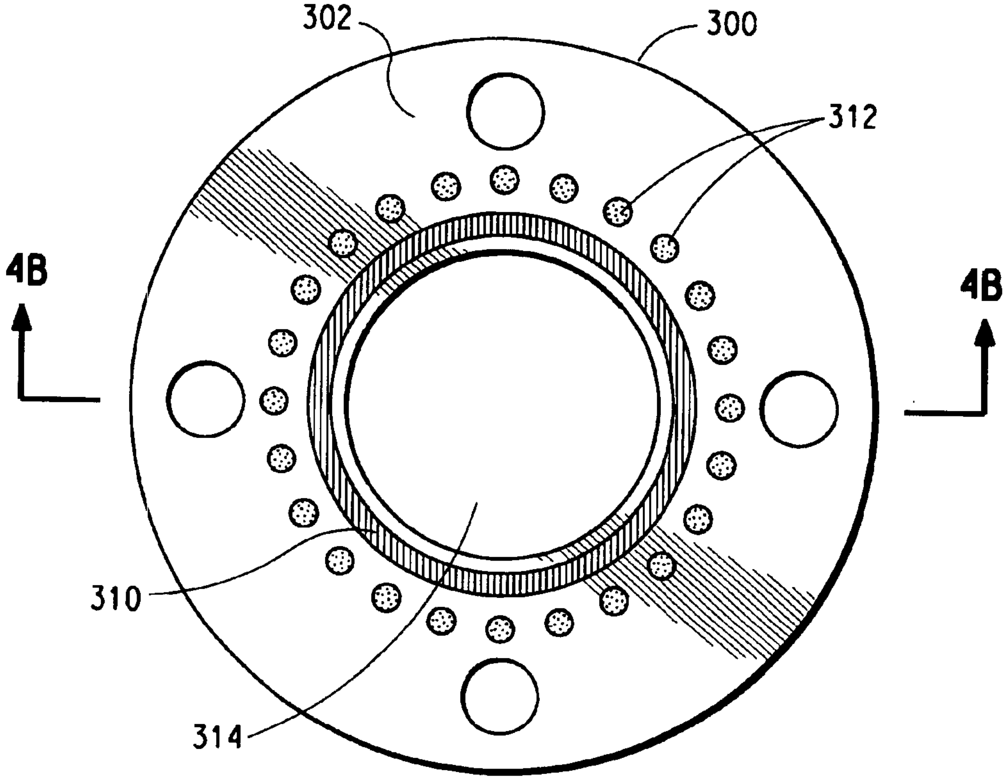
FIGS. 4A and 4B, respectively, show a plan view and a cross-section view taken along line 4B—4B of an elastomer part of this invention mounted in a pipe flange, said part having a plurality of external magnets mounted in close proximity to the surface of the part.
Figure 4B:
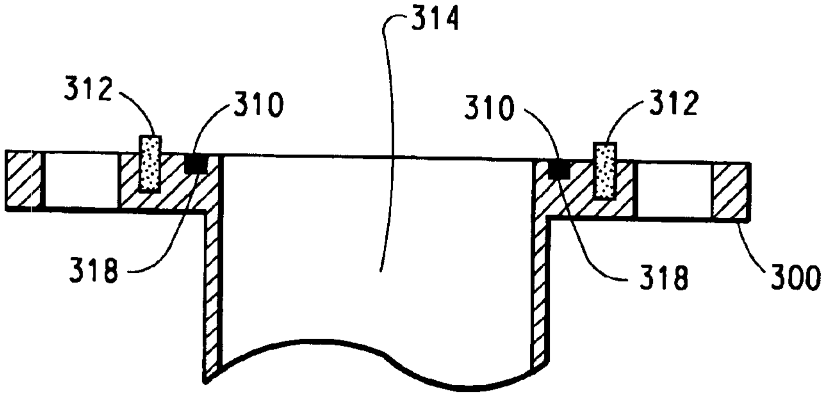

Another useful application for the elastomer parts of this invention is pipe flanges (FIGS. 4A and 4B). In this application, elastomer part 310, having a magnetic flux density at its surface of at least 10 gauss (preferably at least 200 gauss) is mounted in groove 318 on sealing surface 302 of flange 300. Permanent magnets 312 are also mounted on flange 300 around the periphery and in close proximity to seal 310.

EXAMPLES

Example 1

The effect of an internal permanent magnet on the plasma resistance of a fluoroelastomer part was measured in this example using ferrite-rubber magnets of varying magnetic flux density. The fluoroelastomer employed was a commercially available type (Technoflon® PFR91) from Solvay.

A curable compound containing a) 100 parts by weight fluoroelastomer per 100 parts by weight rubber (i.e. 100 phr), b) 1.5 phr organic peroxide (Luperco 101XL available from Pennwalt Corp.), c) 2 phr triallyl isocyanurate co-agent (75% dispersion); d) 5 phr ZnO acid acceptor and 15 phr carbon black MT (N-990 available from Engineered Carbons Inc.) was made on a mill.

Cured slabs (10×10×10 mm) were made by press molding (170° C., 6 minutes) the compound with a 5×5×5 mm ferrite-rubber magnet embedded at the center of the fluoroelastomer slab. The ferrite-rubber magnets were obtained from Ono Gomu Kogyo Co., Ltd. Magnet type OSF-14CP imparted a magnetic flux density of 2 gauss at the surface of the cured slab. Type OMI-05 imparted a 100 gauss flux density and type OM-16 imparted a 335 gauss magnetic flux density, as measured by a gauss meter (Lake Shore, Model 421). A control slab, not containing a magnet, was also molded by the same procedure.

The cured slabs thus produced were exposed to a $SF_6$/Ar (1:2 volume ratio) plasma in a 2.45 GHz microwave cavity plasma reactor (550 watts) at a gas flow rate of 5 standard cubic centimeters per minute (sccm), and a pressure of 27 Pa.

After 60 minutes exposure, both the control slab (no internal magnet) and the slab having only a 2 gauss magnetic flux density at its surface had lost 2.9% of their initial weight. The slab having a 100 gauss flux density at its surface had lost 2.2% of its initial weight. The slab having a 335 gauss flux density had lost 1.5% of its initial weight.

Example 2

The effect of internal permanent magnets on the plasma resistance of a perfluoroelastomer part was measured in this example using cylindrical (5 mm diameter, 5 mm height) samarium-cobalt magnets (available from Masmaterial Co., Ltd.). The perfluoroelastomer employed was a copolymer of tetrafluoroethylene, perfluoro(methyl vinyl ether) and perfluoro(8-cyano-5-methyl-3,6-dioxa-1-octene).

A peroxide curable compound containing 100 phr perfluoroelastomer, b) 0.5 phr $TiO_2$ and c) 10 phr silica was made on a mill.

Cured slabs (90×10×10 mm) were made by compression molding (177° C. for 10 minutes) the compound with six of the above-described magnets embedded in the center of the slab at equal distances along the length. Each of the magnets was aligned so that the poles of all the magnets faced in the same direction. Slabs were then post cured in a 180° C. air oven for 20 hours. This resulted in a cured part having a 650 gauss magnetic flux density at it surface. A control slab, not containing any magnets, was also molded by the same procedure.

The cured slabs thus produced were exposed to a $O_2$/He (1:2 volume ratio) plasma in a 2.45 GHz microwave cavity plasma reactor (600 watts) at a gas flow rate of 0.25 standard cubic centimeters per minute (sccm), and a pressure of 1.3 Pa.

After 60 minutes exposure, the control slab (no internal magnet) had lost 0.2% of its initial weight. The slab having a 650 gauss flux density at its surface had lost 0.1% of its initial weight.

Example 3

The effect of an external permanent magnet on the plasma resistance of a perfluoroelastomer part was measured in this example. The part employed was an AS-110 Kalrez® perfluoroelastomer O-ring (available from DuPont Dow Elastomers). The O-ring was mounted in a groove formed on the surface of an aluminum block. The groove surrounded a cylindrical (6 mm diameter, 21 mm height) samarium-cobalt magnet (available from Masmaterial Co., Ltd.) that was embedded in the aluminum block (FIG. 2A). The external magnet produced a flux on the surface of the O-ring of 250 gauss. A control was also set up wherein no magnet was mounted on the aluminum block.

The mounted O-rings were exposed to a $SF_6$/Ar (1:2 volume ratio) plasma in a 2.45 GHz microwave cavity plasma reactor (600 watts) at a gas flow rate of 2 sccm, and a pressure of 13 Pa.

After 2 hours exposure, the control O-ring (no external magnet) had lost 2% of its initial weight. The O-ring having a 250 gauss flux density at its surface had lost 0.7% of its initial weight.

Example 4

The effect of internal permanent magnets on the plasma resistance of a fluoroelastomer O-ring was measured in this example using cylindrical (2 mm diameter, 2 mm height) samarium-cobalt magnets (available from Masmaterial Co., Ltd.). An O-ring (AS-214) of this invention was molded to contain 20 magnets, having poles aligned, as shown in FIG. 1. The resulting O-ring had a magnetic flux density at its surface of 80–120 gauss.

The AS-214 O-ring of this invention (containing magnets) and a control AS-214 fluoroelastomer O-ring (not containing any magnets) were exposed to an $Ar/O_2$ (1:1 volume ratio) plasma in a 2.45 GHz microwave cavity plasma reactor (125 watts) at a gas flow rate of 110 sccm, and a pressure of 3 Pa.

After 60 minutes exposure, the control O-ring (no internal magnet) had lost 2.8% of its initial weight, whereas the O-ring of the invention had lost 1.4% of its initial weight.

What is claimed is:

1. A process for protecting a surface of an elastomer part from degradation due to exposure to reactive plasma, said process comprising imparting a magnetic flux density of at least 10 gauss to said surface of said part prior to exposing said part to reactive plasma whereby weight loss of said part is at least 20% less than weight loss of a second identical elastomer part, not having a magnetic flux density of at least 10 gauss at its surface, exposed to reactive plasma under identical conditions.

2. A process of claim 1 wherein said magnetic flux density is at least 200 gauss.

3. A process of claim 1 wherein a source of magnetic flux density is magnetic material contained within said part.

4. A process of claim 3 wherein said magnetic material is at least one magnet selected from the group consisting of permanent magnets and electromagnets.

5. A process of claim 4 wherein said permanent magnet is selected from the group consisting of ferrite magnets, ferrite-rubber magnets, aluminum-nickel-cobalt magnets, samarium-cobalt magnets and neodymium magnets.

6. A process of claim 1 wherein a source of magnetic flux density is one or more magnets external to said part, wherein said magnets are placed in close proximity to said surface of said part which is exposed to plasma while in use.

7. A slit valve door for exposure to reactive plasma, said door having a sealing surface and an elastomer part mounted on said sealing surface and wherein at least one magnet is mounted on said door, said magnet mounted in close proximity to said elastomer part so as to result in a magnetic flux density of at least 10 gauss on a surface of said elastomer part that is exposed to reactive plasma when in use whereby weight loss of said part is at least 20% less than weight loss of a second identical elastomer part, not having a magnetic flux density of at least 10 gauss at its surface, exposed to reactive plasma under identical conditions.

8. A pipe flange for exposure to reactive plasma, said flange having a sealing surface and an elastomer part mounted on said sealing surface and wherein at least one magnet is mounted on said sealing surface, said magnet mounted in close proximity to said elastomer part so as to result in a magnetic flux density of at least 10 gauss on a surface of said elastomer part that is exposed to reactive plasma when in use whereby weight loss of said part is at least 20% less than weight loss of a second identical elastomer part, not having a magnetic flux density of at least 10 gauss at its surface, exposed to reactive plasma under identical conditions.

* * * * *